United States Patent
Tseng et al.

(10) Patent No.: US 7,841,928 B2
(45) Date of Patent: Nov. 30, 2010

(54) MULTI-CHANNEL POULTRY STUNNER WITH CURRENT SHARING FEATURE

(75) Inventors: Sheng-Yu Tseng, Xingang Shiang (TW);
Chien-Te Hsieh, Pingzhen (TW);
Kou-Joong Lin, Chiayi (TW);
Tien-Shuh Yang, Taipei (TW)

(73) Assignee: Chang Gung University, Tao-Yuan (TW)

( * ) Notice: Subject to any disclaimer, the term of this patent is extended or adjusted under 35 U.S.C. 154(b) by 329 days.

(21) Appl. No.: 12/205,853

(22) Filed: Sep. 6, 2008

(65) Prior Publication Data
US 2009/0227191 A1    Sep. 10, 2009

(30) Foreign Application Priority Data
Mar. 6, 2008  (TW) .............................. 97107898 A

(51) Int. Cl.
*A22B 3/06* (2006.01)
(52) U.S. Cl. ...................................... 452/58
(58) Field of Classification Search ............ 452/57–60, 452/65, 141–144; 231/7
See application file for complete search history.

(56) References Cited

U.S. PATENT DOCUMENTS

| | | | | |
|---|---|---|---|---|
| 3,683,113 A * | 8/1972 | Stewart | ....................... | 704/258 |
| 5,954,572 A * | 9/1999 | Kettlewell et al. | ............. | 452/58 |
| 6,471,576 B1 * | 10/2002 | Ross | ........................... | 452/58 |
| 7,025,669 B2 * | 4/2006 | Richards | ..................... | 452/141 |
| 7,174,668 B2 * | 2/2007 | Locklear | ..................... | 43/17.1 |
| 7,377,846 B2 * | 5/2008 | Umeda | .......................... | 453/3 |

* cited by examiner

*Primary Examiner*—Thomas Price
(74) *Attorney, Agent, or Firm*—Ming Chow; Sinorica, LLC

(57) ABSTRACT

A multi-channel poultry stunner with current sharing feature comprises at least two electrodes connected to at least one poultry and a current sharing circuit connected to the electrodes and a stunning voltage. The current sharing circuit generates at least four sets of dither voltages applied onto the poultry via the electrodes. The poultry is stunned by a stunning current generated on the poultry by the dither voltages and the stunning voltage. The advantages of small size and light weight can be accomplished, and very good conversion efficiency can be achieved. Moreover, a stunning current with current sharing feature can be produced to enhance poultry carcass quality.

7 Claims, 19 Drawing Sheets

MULTI-CHANNEL POULTRY STUNNER WITH CURRENT SHARING FEATURE

BACKGROUND OF THE INVENTION

1. Field of the Invention

The present invention relates to a stunner and, more particularly, to a multi-channel poultry stunner with current sharing feature.

2. Description of Related Art

Following the world trend, it has become an important issue to value and protect live animals. Animal protection laws have thus been regulated. Especially, in order to meet the requirement of humane slaughtering, it is necessary to put livestock or poultry under painless situations before slaughtering them. There are two humane stunning methods commonly used worldwide: carbon dioxide stunning and electrical stunning. Because carbon dioxide stunning has the disadvantages of large space required, long stunning time and high cost, its use is limited. Because electrical stunning has a low cost and easy operation, it has been widely used in humane slaughtering of livestock or poultry.

The stunning mechanism of electrical stunning used in humane slaughtering of livestock or poultry primarily utilize a current passing the central nervous system to suppress the transmission of neural signals so as to let them lose consciousness. In order to suppress the transmission of neural signals, the current needs to be very large. But a too large stunning current will deteriorate carcass quality. Therefore, a humane stunning system of high stability and good characteristic is very important during the slaughtering process of livestock or poultry. The power supply manner of the humane stunner can generally be divided into two types: utility grid power supply system and battery power supply system. The utility grid power supply system uses a silicon steel transformer to directly step up or step down the low frequency power grid voltage to a stunning voltage required for stunning livestock or poultry. On the other hand, the battery power supply system uses a power switch to cut the battery voltage into a square voltage waveform, and then uses a silicon steel transform of high step-up ratio to convert the battery voltage into a required stunning voltage. In the above conventional stunner, there is no voltage regulation, and it is easy to generate a too large stunning current to affect carcass quality. As shown in FIG. 1, for a stunner 10 adopting two electrodes, the applied stunning voltage $V_{AB}$ needs to be higher than the skin breakdown voltage of the poultry 12. This will cause a too large stunning current to affect carcass quality. Moreover, the silicon steel transformer used in the power supply system will result in a bulky stunner and low efficiency.

Accordingly, the present invention aims to propose a multi-channel stunner with current sharing feature to solve the above problems in the prior art. The proposed multi-channel stunner with current sharing feature is small and light, has high conversion efficiency, and can generate a stunning current with current-sharing feature to enhance carcass quality.

SUMMARY OF THE INVENTION

An object of the present invention is to provide a multi-channel stunner with current sharing feature, which can generate a stunning current with current-sharing feature to enhance carcass quality.

Another object of the present invention is to provide a multi-channel stunner with current sharing feature, which has the advantages of small size and light weight.

To achieve the above objects, the present invention provides a multi-channel stunner with current sharing feature, which comprises at least two electrodes and a current sharing circuit. The electrodes are connected to at least one poultry. The current sharing circuit is connected to the electrodes and a stunning voltage, and generates at least four sets of dither voltages applied onto the poultry via the electrodes. The poultry is stunned by a stunning current with current sharing feature generated on the poultry by the dither voltages and the stunning voltage.

BRIEF DESCRIPTION OF THE DRAWINGS

The various objects and advantages of the present invention will be more readily understood from the following detailed description when read in conjunction with the appended drawing, in which.

DETAILED DESCRIPTION OF THE PREFERRED EMBODIMENTS

Figure 1:
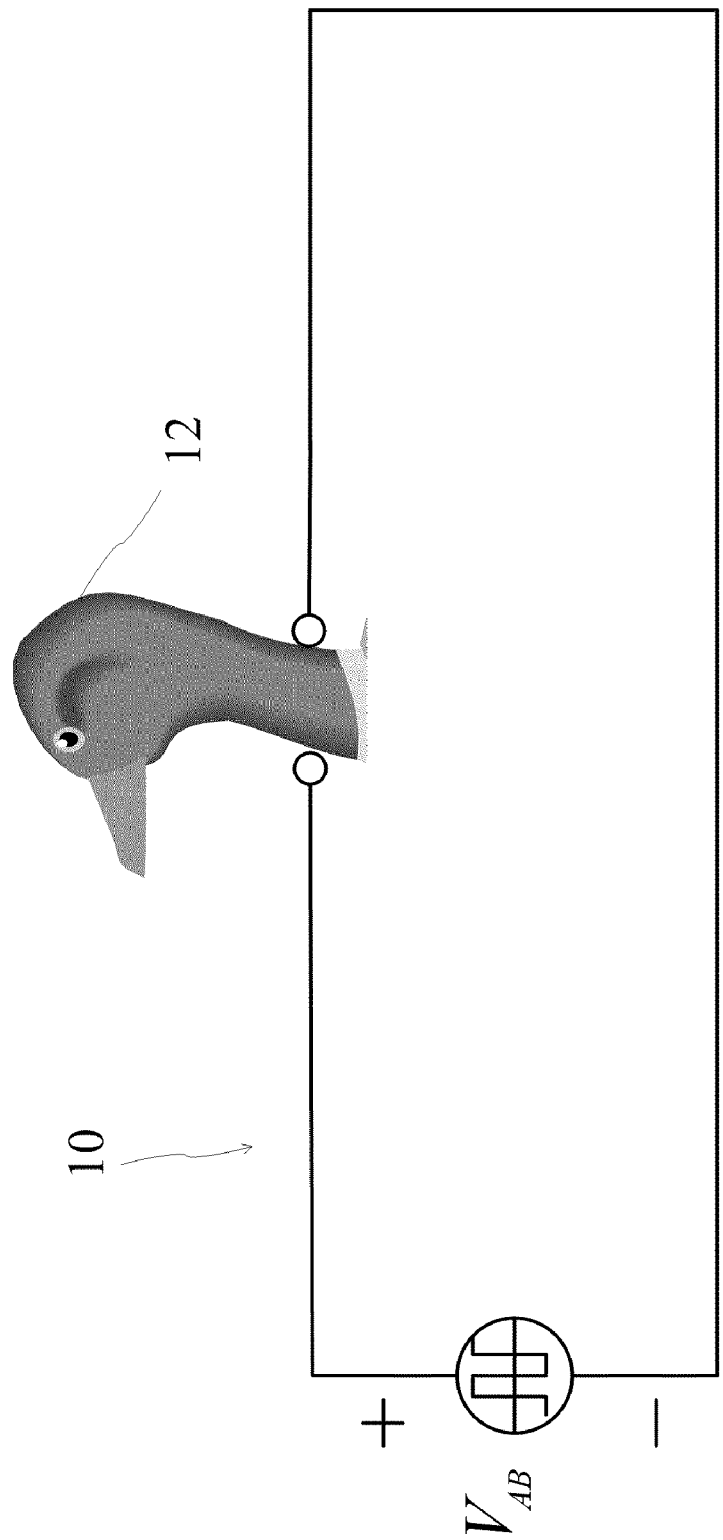
FIG. 1 is a circuit diagram of the prior art.
Figure 2:
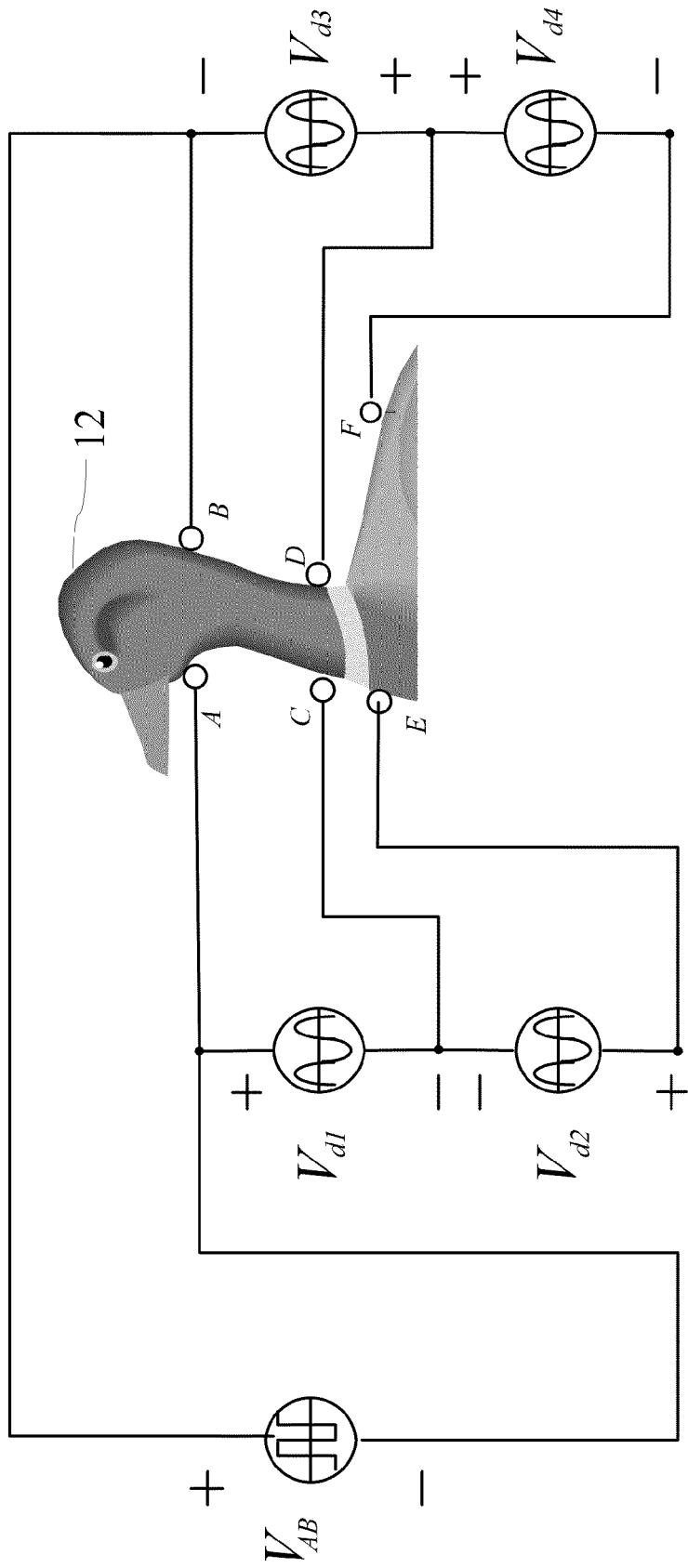
FIG. 2 is a circuit diagram of the multi-electrode architecture of the present invention.

For the conventional stunner adopting two electrodes, the applied stunning voltage needs to be higher than the skin breakdown voltage of poultry, which will lead to a too large stunning current and thus affect carcass quality. Therefore, as shown in FIG. 2, the present invention combines four dither voltages $V_{d1}$, $V_{d2}$, $V_{d3}$ and $V_{d4}$ to drive a multi-electrodes stunner so as to electrically stun the poultry 12.

If the present invention is used for one poultry, the generated stunning current will electrically stun the poultry via only a single channel. The present invention can also be used for a plurality of poultry, and can electrically stun a plurality of poultry at the same time via several channels. In the following embodiment, two poultry will be stunned by using twelve electrodes via two channels.

Figure 3:
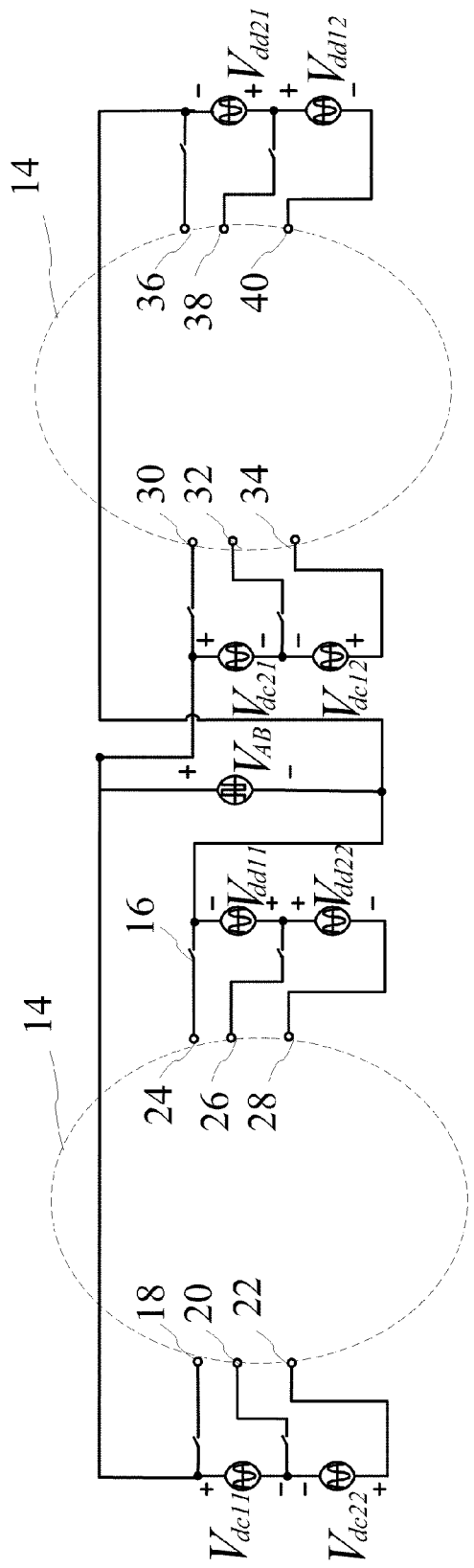
FIG. 3 is a circuit diagram of the present invention.
Figure 4:
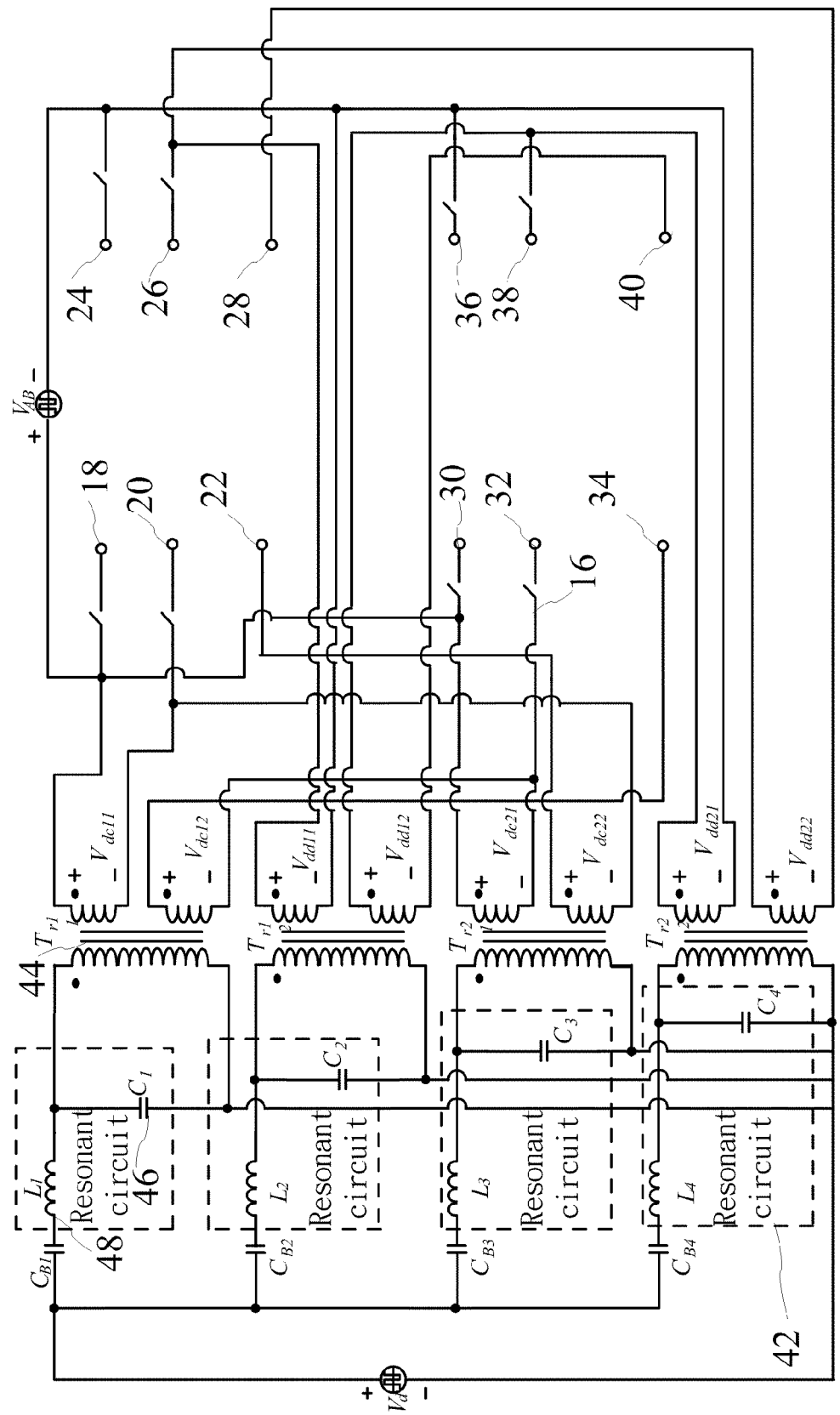
FIG. 4 is a circuit diagram of the current sharing circuit of the present invention.
Figure 5:
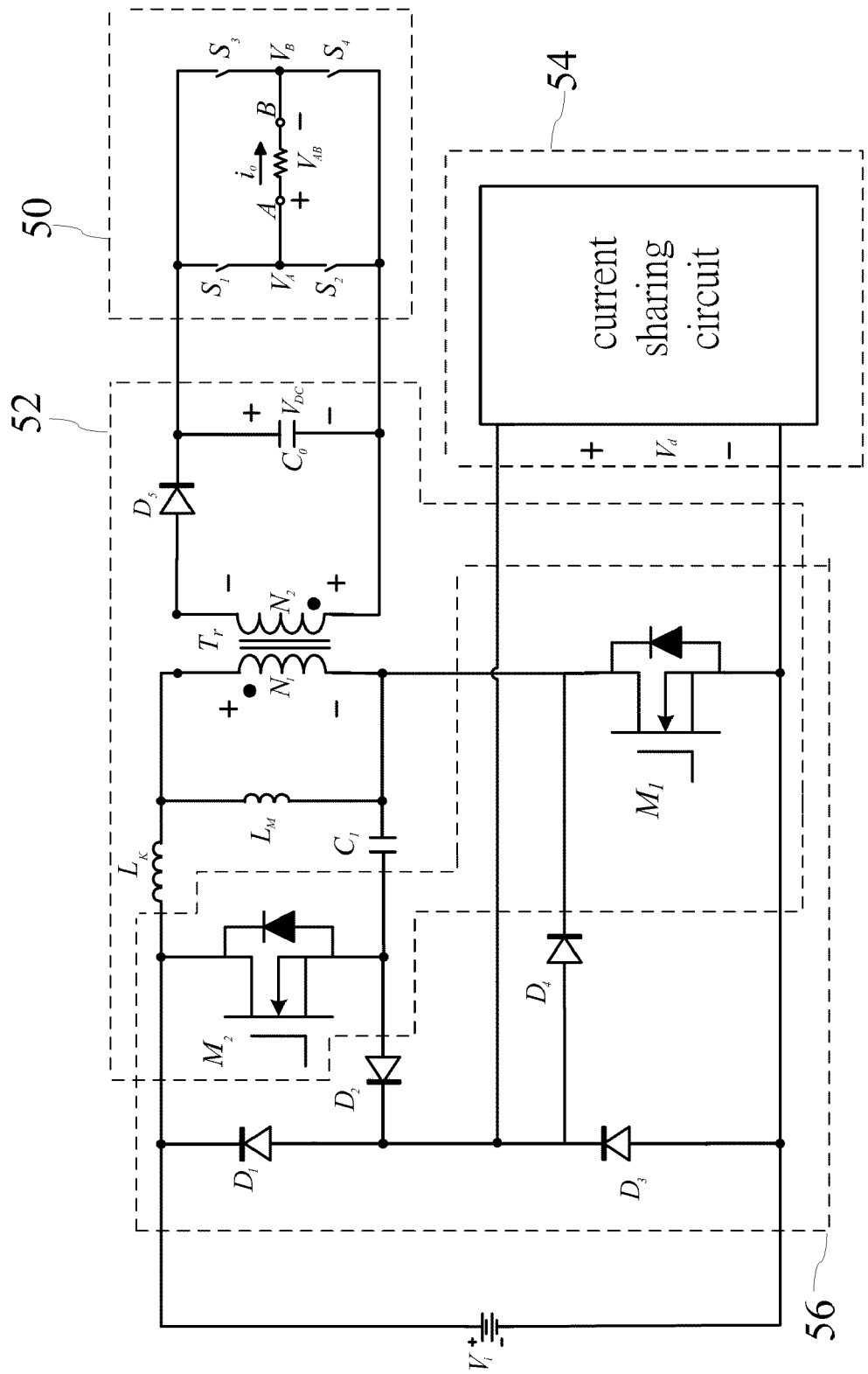
FIG. 5 is a circuit diagram of various parts of the present invention.

Reference is made to FIGS. 3, 4 and 5 simultaneously. The present invention includes electrodes 18, 20, 22, 24, 26, 28, 30, 32, 34, 36, 38, and 40. The front six electrodes and the rear six electrodes are connected to poultry 14, respectively. A current sharing circuit 54 is connected to the above twelve electrodes and a stunning voltage $V_{AB}$, and generates at least four sets of dither voltage applied to the poultry 14 via the electrodes. Any two sets of dither voltage are series connected together and have the same amplitude and opposite polarities. Any two sets of series-connected dither voltage connected to the poultry 14 and the connection position of each set of dither voltage and the stunning voltage are connected to the poultry 14 via induction relay switches 16, respectively. Each induction relay switch 16 is cut off after the skin impedance of the poultry breaks down so that each set of the dither voltages and the stunning voltage produce the stunning current with current sharing feature on the poultry 14 to stun the poultry 14. Because each set of dither voltage includes two dither voltages, there are totally eight dither voltages-$V_{dc11}$, $V_{dc12}$, $V_{dd11}$, $V_{dd12}$, $V_{dc21}$, $V_{dc22}$, $V_{dd21}$, and $V_{dd22}$. All the above dither voltages are high-frequency AC signals. This dither voltage method not only fast breaks down the skin impedance of poultry to reduce the voltage stress of poultry during the stunning period, but also reduces the pressure of electrically stunned poultry, thereby enhancing carcass quality.

The current sharing circuit 54 includes four transformers 44 connected to the twelve electrodes and the stunning voltage $V_{AB}$ and four resonance circuits 42 connected to the transformers 44. Each transformer 44 generates a set of dither voltage applied onto the poultry 14. Each resonance circuit 42 drives one of the transformers 44. The resonance circuit 42 also includes a capacitor 46 and an inductor 48. Two terminals of the capacitor 46 are respectively connected to one of the transformers. The corresponding transformer can receive a voltage across the two terminals of the capacitor to produce one set of dither voltage. One terminal of the inductor 48 is connected to one terminal of the capacitor 46, and the other terminal thereof is connected to a total dither voltage $V_d$. The total dither voltage $V_d$ can generate a current passing the inductor 48 and build a potential difference across the two terminals of the capacitor 46.

The stunning voltage $V_{AB}$ is generated by a full-bridge inverter 50 connected to an active clamp flyback converter 52. The active clamp flyback converter 52 can drive the full-bridge inverter 50. A half-bridge inverter 56 is integrated with the active clamp flyback converter 52, and is connected to an input voltage $V_i$ and the current sharing circuit 54. The input voltage $V_i$ can drive the half-bridge inverter 56 to activate the active clamp flyback converter 52 and the current sharing circuit 54. In the circuits of the present invention, DC/DC conversion and generation of dither voltage are achieved by means of synchronous switch technology to simplify the circuit architecture of the proposed stunning system, thereby reducing component counts, lowering weight and size, enhancing conversion efficiency, and also easily expanding various protection functions.

Figure 6:
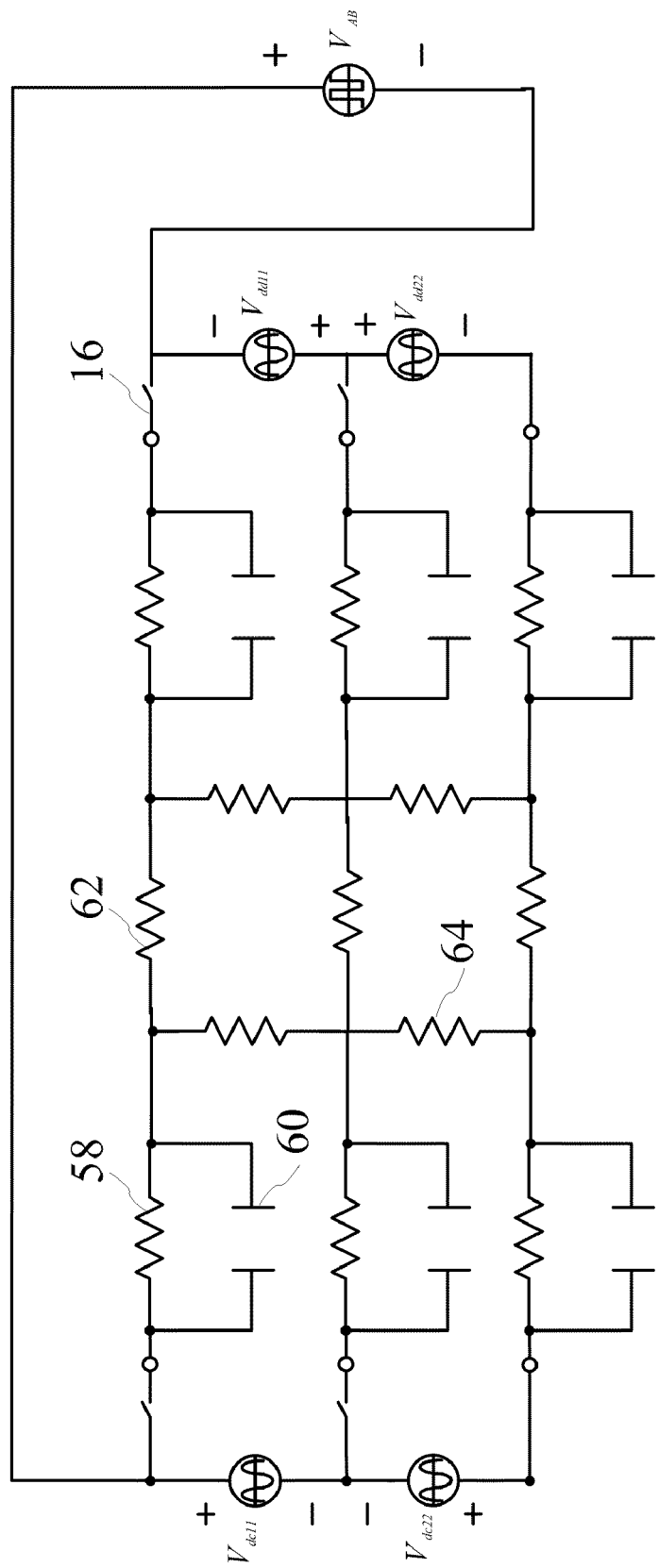
FIG. 6 is an equivalent circuit diagram of the present invention.

As shown in FIG. 6, the poultry connected between four dither voltages $V_{dc11}$, $V_{dc22}$, $V_{dd11}$, and $V_{dd22}$ is replaced with an equivalent circuit. There are six circuits of a cuticle effective resistor 58 and a cuticle effective capacitor 60 shunted together. These circuits represent skin impedances of poultry. There are three effective resistors 62 at the center of the equivalent circuit. There are four effective resistors 64 between the effective resistors 62 and the skin impedances.

All the effective resistors 62 and 64 are effective resistors of internal tissue of poultry, but have different resistance values.

Figure 7:
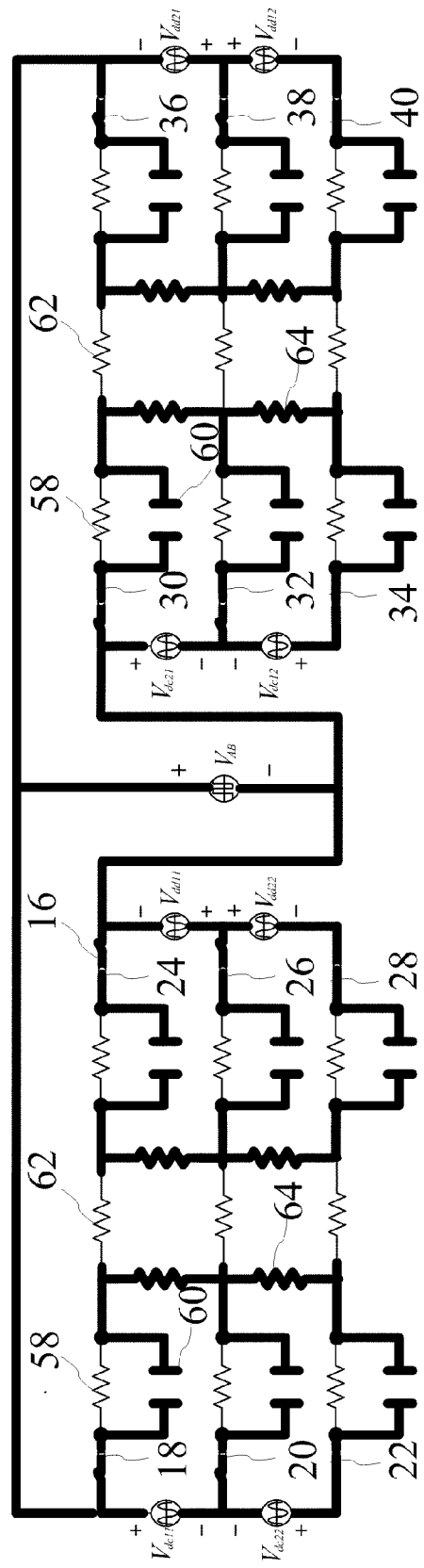
FIGS. 7 to 10 are equivalent circuit diagrams of various operation states of the present invention.
Figure 11:
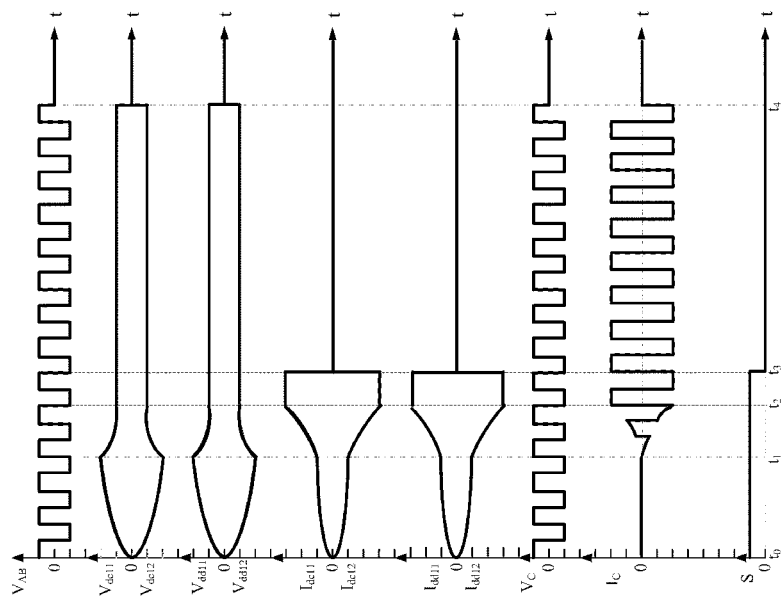
FIG. 11 is a waveform diagram of various voltages, currents and the relay switch of the present invention.

As can be known from the waveform shown in FIG. 11, there are four operation states in the circuit action of the present invention. Reference is made to FIG. 7 as well as FIG. 11. $I_{dc11}$, $I_{dc12}$, $I_{dd11}$, and $I_{dd12}$ are currents generated by $V_{dc11}$, $V_{dc12}$, $V_{dd11}$, and $V_{dd12}$, respectively. S represents the state of the induction relay switch 16. A high level means on, while a low level means off. $V_C$ and $I_C$ represent the voltage and current between the electrodes 22, 28 and the electrodes 34, 40.

Before $t_0$, the induction relay switch 16 is cut off, and the stunning voltage $V_{AB}$ and the dither voltages $V_{dc11} \sim V_{dd22}$ are all 0 V. At $t=t_0$, the induction relay switch 16 is on. Meanwhile, the dither voltage $V_{dc11}$ and $V_{dc22}$ are respectively across the electrodes 18, 20 and the electrodes 22, 20, and the dither voltage $V_{dd11}$ and $V_{dd22}$ are respectively across the electrodes 24, 26 and the electrodes 28, 26. At the same time, the amplitudes of the high frequency dither voltages $V_{dc11}$, $V_{dc22}$, $V_{dd11}$, and $V_{dd22}$ gradually rise from 0 to maximum. Besides, the low frequency stunning voltage $V_{AB}$ is across the electrodes 18, 24 or the electrodes 30, 36. In a balanced load system, because the dither voltages $V_{dc11}$, $V_{dc22}$, $V_{dd11}$, and $V_{dd22}$ have the same amplitude and opposite polarities, the voltage $V_C$ across the electrodes 22, 28 equals to the stunning voltage $V_{AB}$. At this time, because the poultry skin impedance has not broken down yet, the high frequency dither voltages will be across a closed loop formed by the high impedance cuticle effective resistors 58 and cuticle effective capacitors 60 (skin effective impedance) and the low impedance effective resistors 62 (internal tissue of poultry), and the dither currents $I_{dc11}$, $I_{dc12}$, $I_{dd11}$, and $I_{dd12}$ will increase slowly from 0. Because the stunning voltage $V_{AB}$ (smaller than the breakdown voltage of poultry skin impedance) is across the electrodes 22, 28, the current $I_C$ is very small (almost 0). In this operation state, the poultry skin impedance has not broken down yet.

Figure 8:
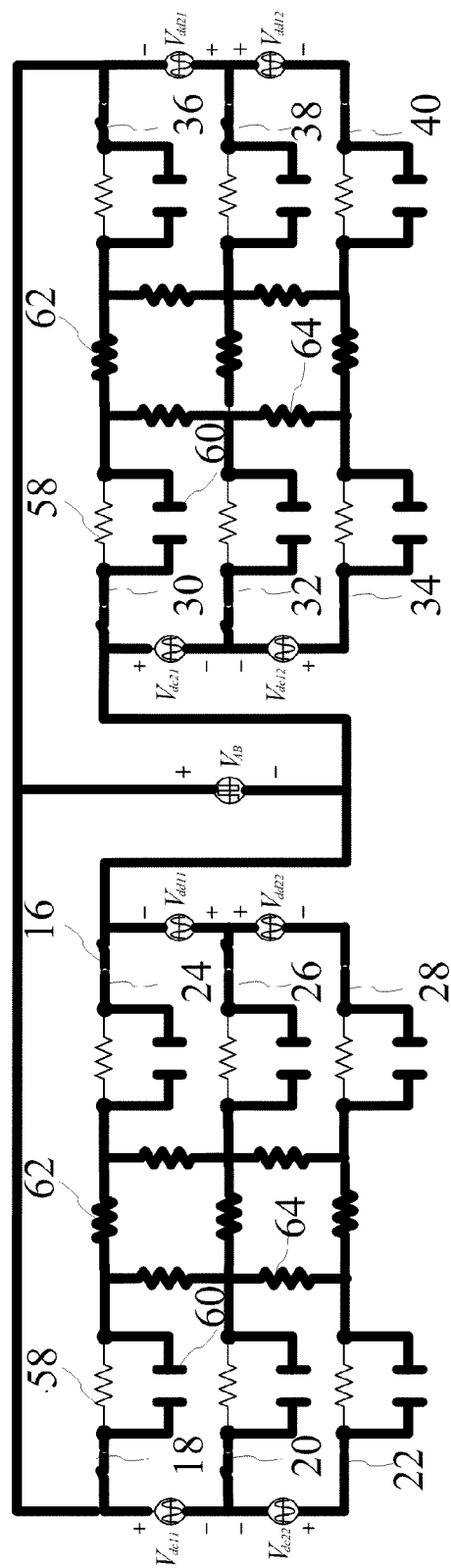
Figure 9:
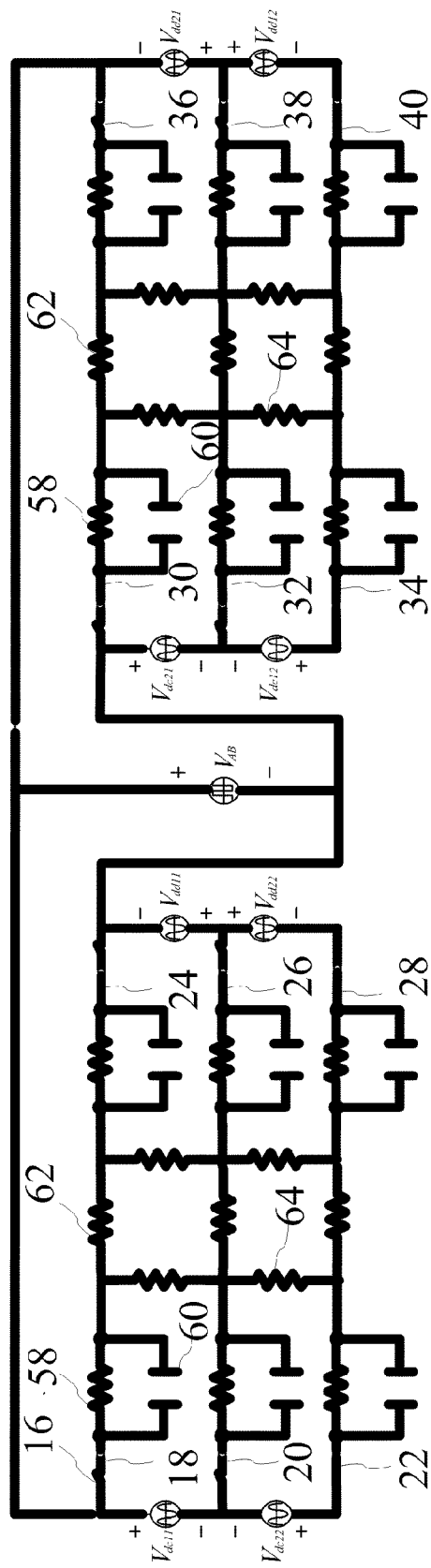
Figure 10:
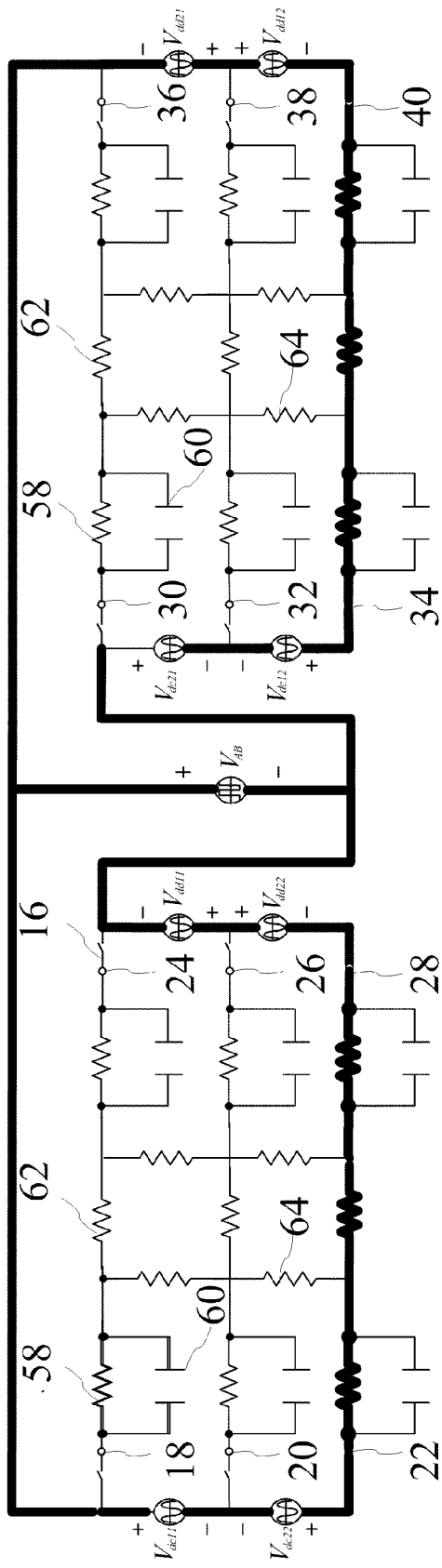

Reference is then made to FIG. 8 as well as FIG. 11. At $t=t_1$, the poultry skin impedance starts to break down. In this state, because the induction relay switch 16 continues keeping on, the high frequency dither voltages $V_{dc11}$, $V_{dc22}$, $V_{dd11}$, and $V_{dd22}$ change from maximum to a stable value, and the dither currents $I_{dc11}$, $I_{dc12}$, $I_{dd11}$, and $I_{dd12}$ changes from a low value to a higher stable value due to reduced poultry impedance. At this time, the voltage across the electrodes 22, 28 still keeps at $V_{AB}$. Because the cuticle effective resistor 58 and the cuticle effective capacitor 60 break down, the impedance decreases so that the current $I_C$ passing the poultry gradually increases to a value sufficient for stunning the poultry.

At $t=t_2$, the poultry skin impedance breaks down completely, and the cuticle effective resistor 58 and the cuticle effective capacitor 60 almost drop to 0. The high frequency dither voltages $V_{dc11}$, $V_{dc22}$, $V_{dd11}$, and $V_{dd22}$ are across internal tissue of poultry (effective resistors 61 and 64) so that the dither voltages drop to a stable value while the currents increase to a stable value. In this state, the current $I_C$ passing the electrodes 22, 28 is large enough for stunning the poultry.

At $t=t_3$, the induction relay switch 16 is cut off, At this time, the high frequency dither voltage and the stunning voltage $V_{AB}$ form a series-connected path. The voltages across the electrodes 18, 20 and the electrodes 20, 22 and the currents passing these electrodes are 0. Moreover, because the induction relay switch 16 is cut off, the high frequency dither voltages $V_{dc11}$, $V_{dc22}$, $V_{dd11}$, and $V_{dd22}$ will slightly increase owing to different impedance they are across (changing from the original effective resistor 62 to the effective resistor 64). In this state, if the poultry impedances in two channels are the same, the voltages across the electrodes 22, 28 and the electrodes 34, 40 will equal to the stunning voltage $V_{AB}$, and the stunning currents $I_C$ are thus the same. If the poultry impedances in two channels are different, the amplitudes of the high frequency dither voltages will differ. The voltages across the electrodes 22, 28 and the electrodes 34, 40 will equal to the stunning voltage $V_{AB}$ plus a voltage difference between the high frequency dither voltages ($V_{dc11}-V_{dc22}+V_{dd11}-V_{dd22}$ or $V_{dc21}-V_{dc12}+V_{dd21}-V_{dd12}$). This will lead the currents $I_C$ passing the two channels to be more uniform, hence achieving the function of current sharing.

At $t=t_4$, the stunning voltage $V_{AB}$ and the dither voltages $V_{dc11}$, $V_{dc12}$, $V_{dd11}$, and $V_{dd12}$ are cut off to finish a stunning period. Therefore, a dither circuit and a current sharing circuit can be combined together to solve the problem of bad stunning effect and bad carcass quality due to different poultry impedances in the conventional multi-channel humane stunning system.

Figure 12:
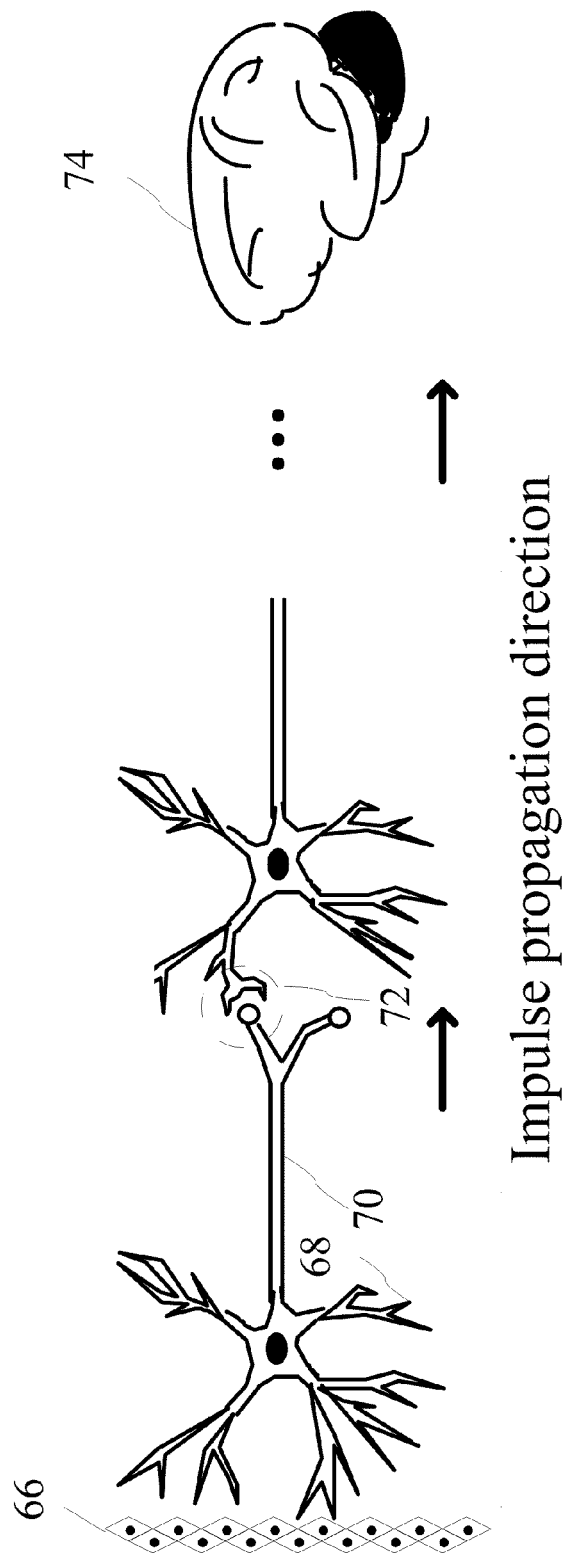
FIG. 12 is a diagram showing the transmission of a neural impulse signal of the present invention.

Reference is made to FIG. 12. The poultry nerve structure can primarily be divided into three parts: soma, axon 70, and dendrite 68. When a sensory receptor located in the cuticle 66 receives a stimulus signal, the signal will be converted to a neural impulse. This impulse signal is converted by a synapse 72 and then transmitted in order along the direction of series-connected ganglions until to a receptor of a brain 74. During the transmission process of this signal, the synapse 72 plays a very important role. The synapse 72 can convert electric signals to chemical signals and then chemical signals to electric signals so that the neural impulse signal can be transmitted from the receptor of the cuticle to the receptor of the brain 74.

Figure 13:
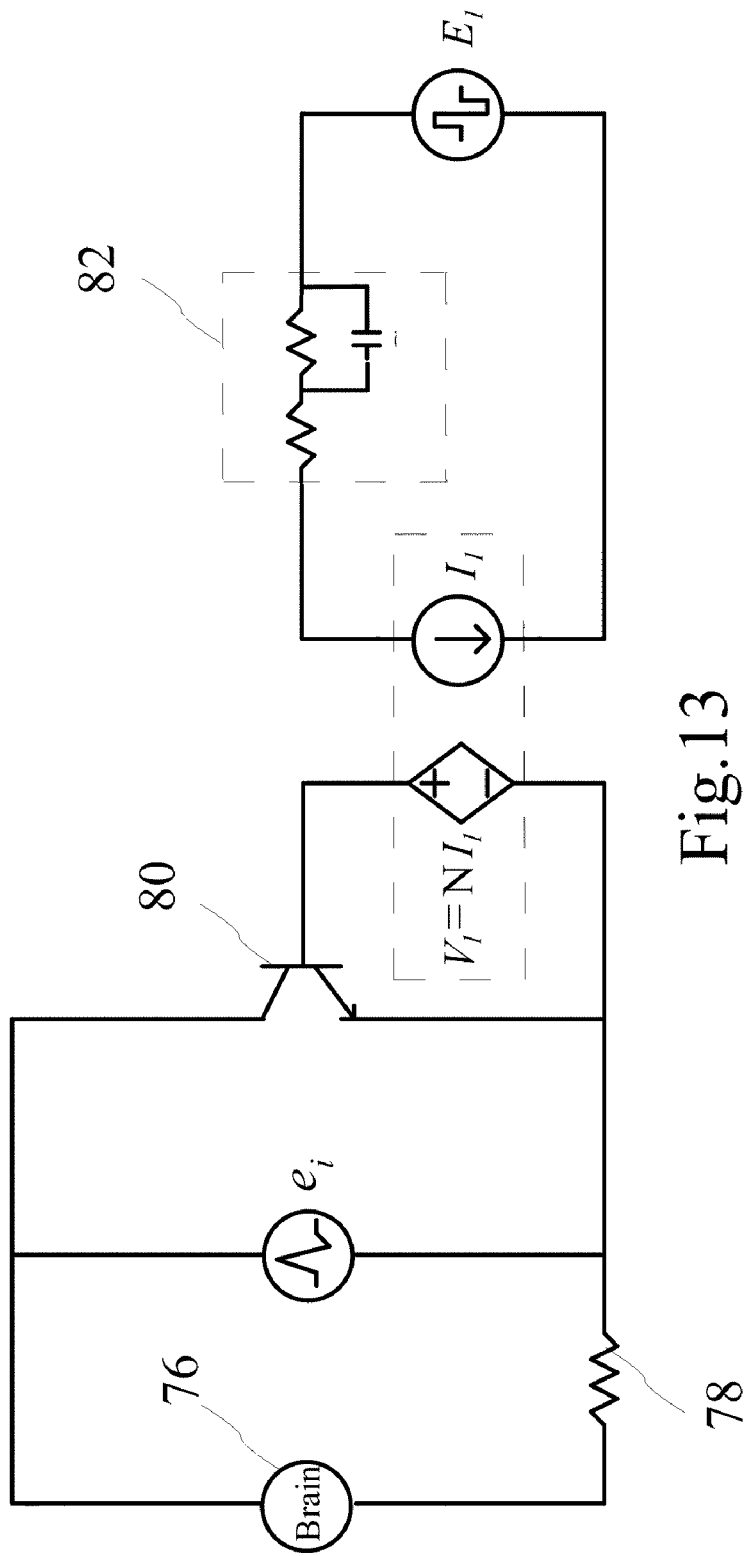
FIG. 13 is an equivalent circuit diagram of nerve fiber transmission of the present invention.

In order to conveniently illustrate the suppression relation between electrical stunning and transmission of neural signals, reference is also made to the equivalent circuit diagram in FIG. 13. In FIG. 13, the synapse 72 plays a role for signal conversion, and is thus equivalent to a switch 80. When an external voltage $E_1$ is applied to the poultry, the poultry skin impedance 82 enters a breakdown state. At this time, a current $I_1$ will pass the poultry. If the current $I_1$ is large enough, it will induce a sufficiently high voltage $V_1$ to turn on the switch 80. When the switch 80 is turned on, a neural impulse signal $e_i$ will be bypassed so that the neural system loses its function of transmitting neural impulse signal. On the contrary, the neural impulse signal ei can reach the sensory receptor of the brain 76 through the transmission impedance 78 between nerves so that the brain 76 can sense the stimulus action transmitted by the neural impulse signal. As can be known from the above description, using the electrical stunning method can effectively suppress the transmission of neural impulse signal $e_i$.

Figure 14:
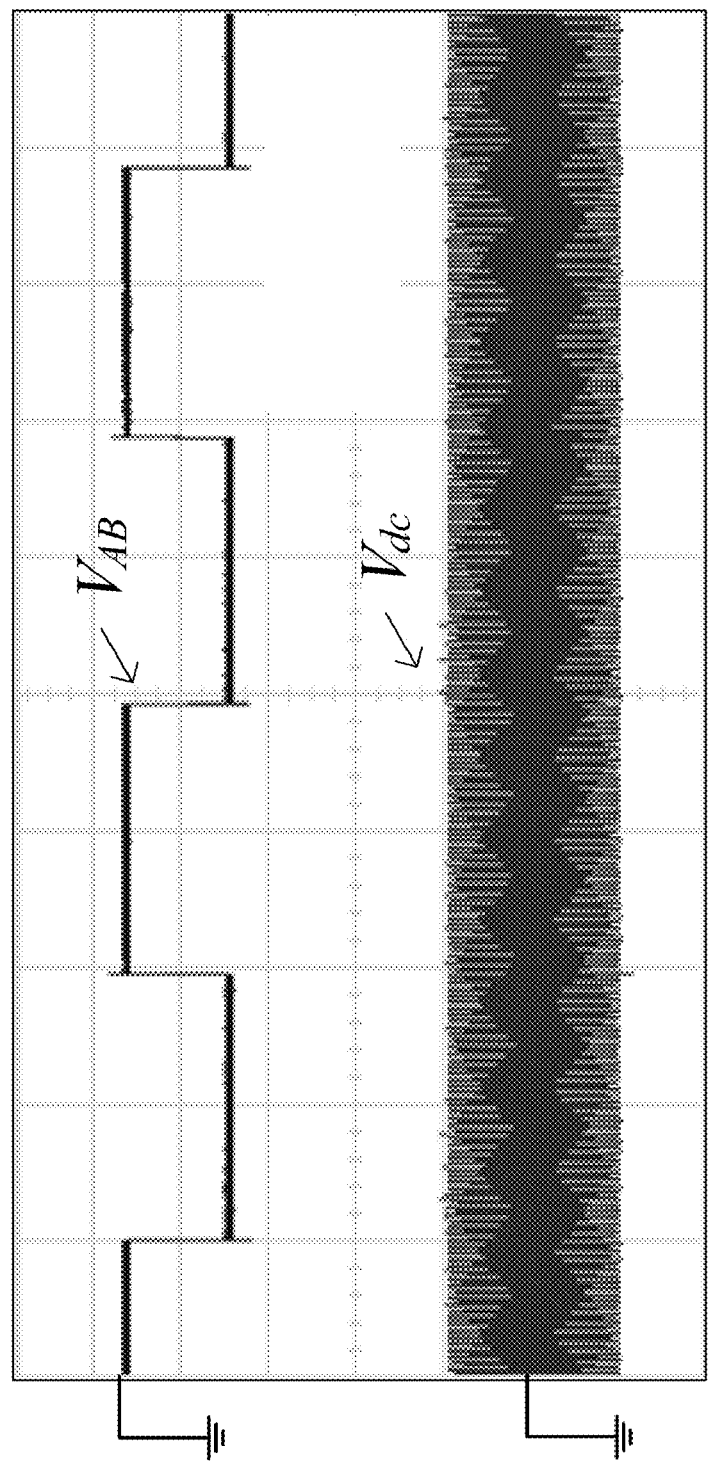
FIG. 14 is a waveform diagram of the stunning voltage and the dither voltage when measuring and simulating poultry impedance of the present invention.
Figure 15:
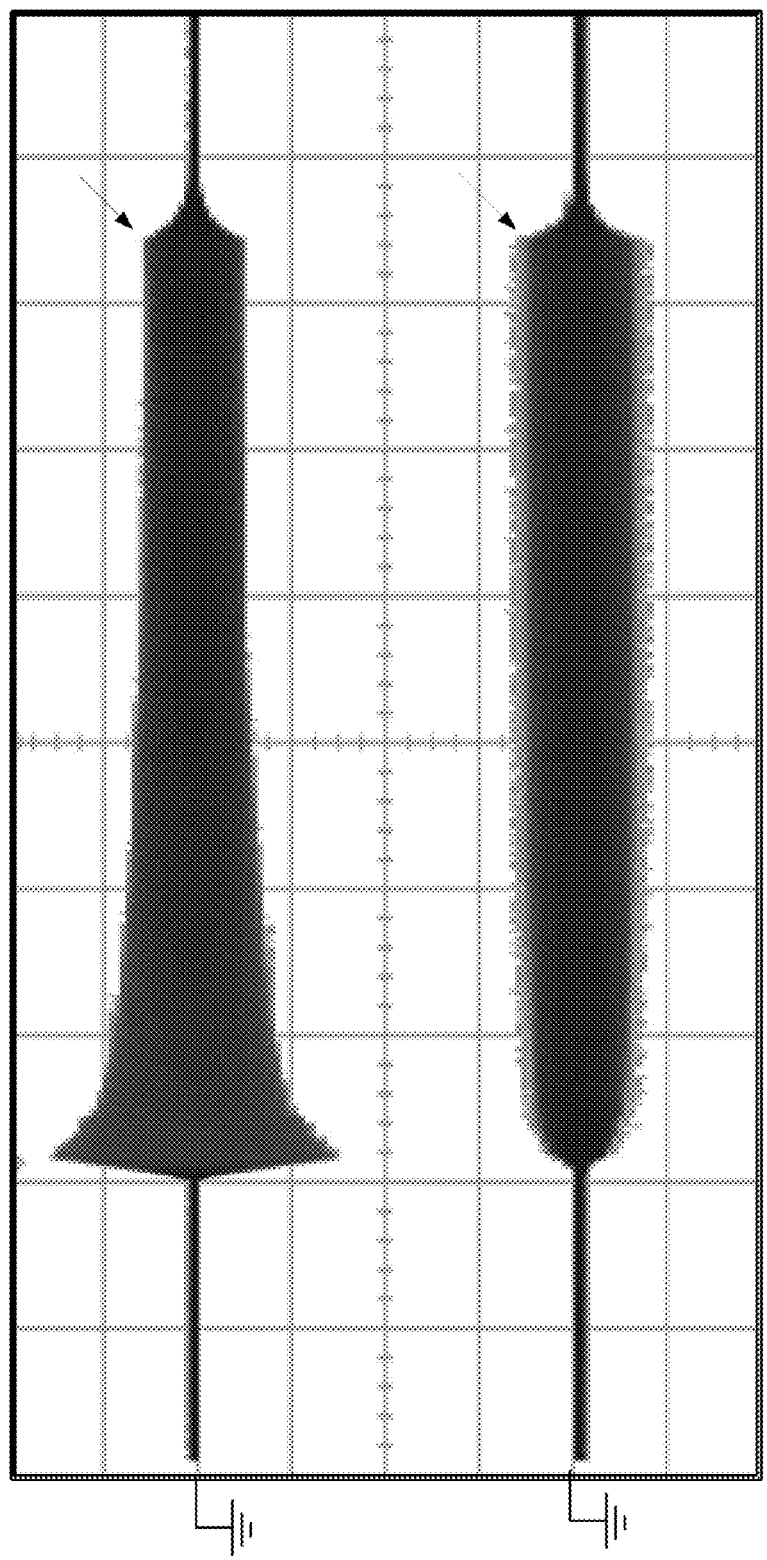
FIG. 15 is a waveform diagram of the stunning voltage and the dither current when measuring and simulating poultry impedance of the present invention.

Reference is made to FIGS. 14 and 15. The poultry skin impedance is very high before breakdown and drops after breakdown. For instance, the skin impedance between two ends of a goose neck is about several hundreds of K ohms before breakdown and drops to about 300~500 ohms after breakdown. In order to conveniently test and verify the proposed humane stunner with current sharing feature, a resistor of 50 K ohms is used to simulate the impedance before breakdown, and resistors of 300 ohms and 500 ohms are used to simulate current sharing feature of the two-channel stunning system. FIG. 14 shows waveforms of the output voltage $V_{AB}$ and the dither voltage $V_{dc}$ before the poultry skin impedance breaks down, where the poultry skin impedance is simulated by a resistor of 50 K ohms. As can be known from FIG. 14, the output voltage $V_{AB}$ of the stunner is of a low frequency 400 Hz, while the dither voltage $V_{dc}$ is of a high frequency (about 50 KHz) and its amplitude can reach 200 V. In order to prove that the dither voltage $V_{dc}$ can break down the goose skin, waveforms of the dither voltage $V_{dc}$ and the dither current $I_{dc}$ is shown in FIG. 15. From the measured waveforms in FIG. 15, the breakdown voltage of goose skin is about 140 V, and the breakdown time is about 300 ms. Therefore, using the dither voltage can help to fast break down the poultry skin impedance.

Figure 16:
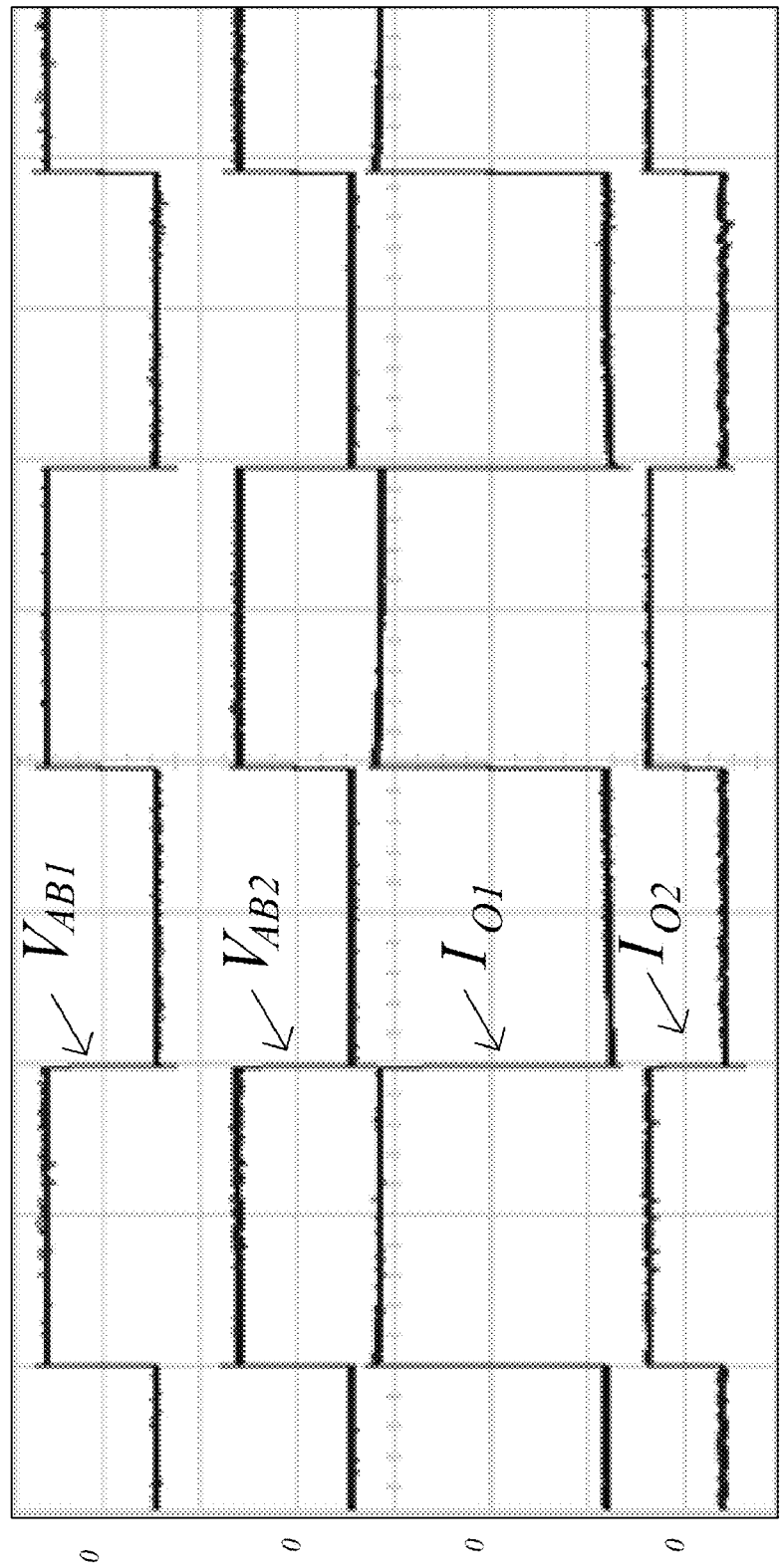
FIG. 16 is a waveform diagram of the stunning voltages and the stunning currents when measuring and simulating poultry impedance of the present invention.
Figure 17:
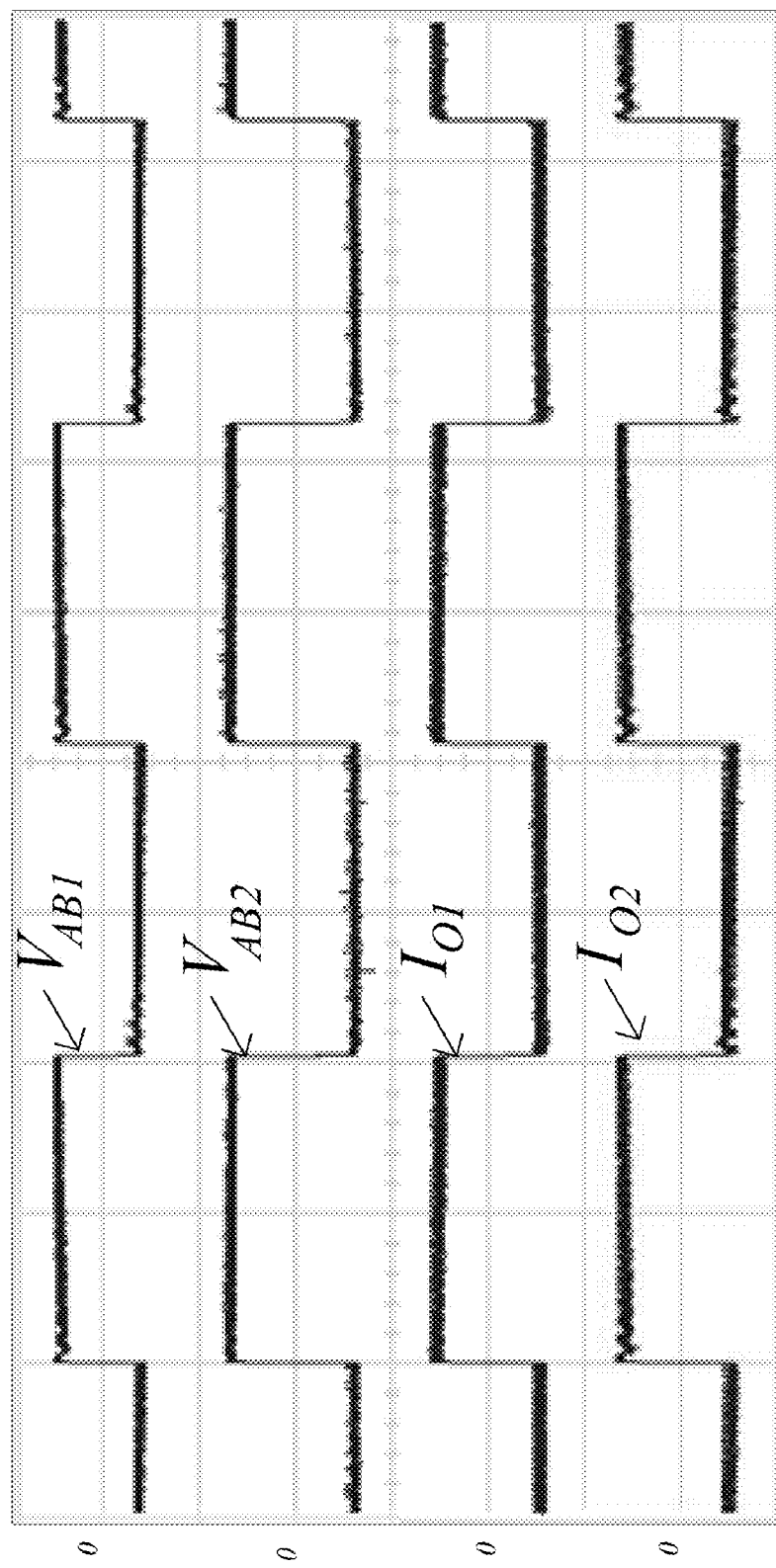
FIG. 17 is a waveform diagram of the stunning voltages and the stunning currents when measuring and simulating poultry impedance of the present invention.

Reference is made to FIG. 16 and FIG. 17. FIG. 16 shows waveforms of the output voltages $V_{AB}$ and the output currents $I_O$ without the current sharing circuit, while FIG. 17 shows waveforms of the output voltages $V_{AB}$ and the output currents $I_O$ with the current sharing circuit. As can be known from FIG. 16 and FIG. 17, when there is no current sharing circuit, the voltages across the loads $V_{AB1}$ and $V_{AB2}$ are identical, while the load currents are different. If a current sharing circuit is added in this stunning system, the voltages across the loads are different, while the load currents are almost the same.

Figure 18:
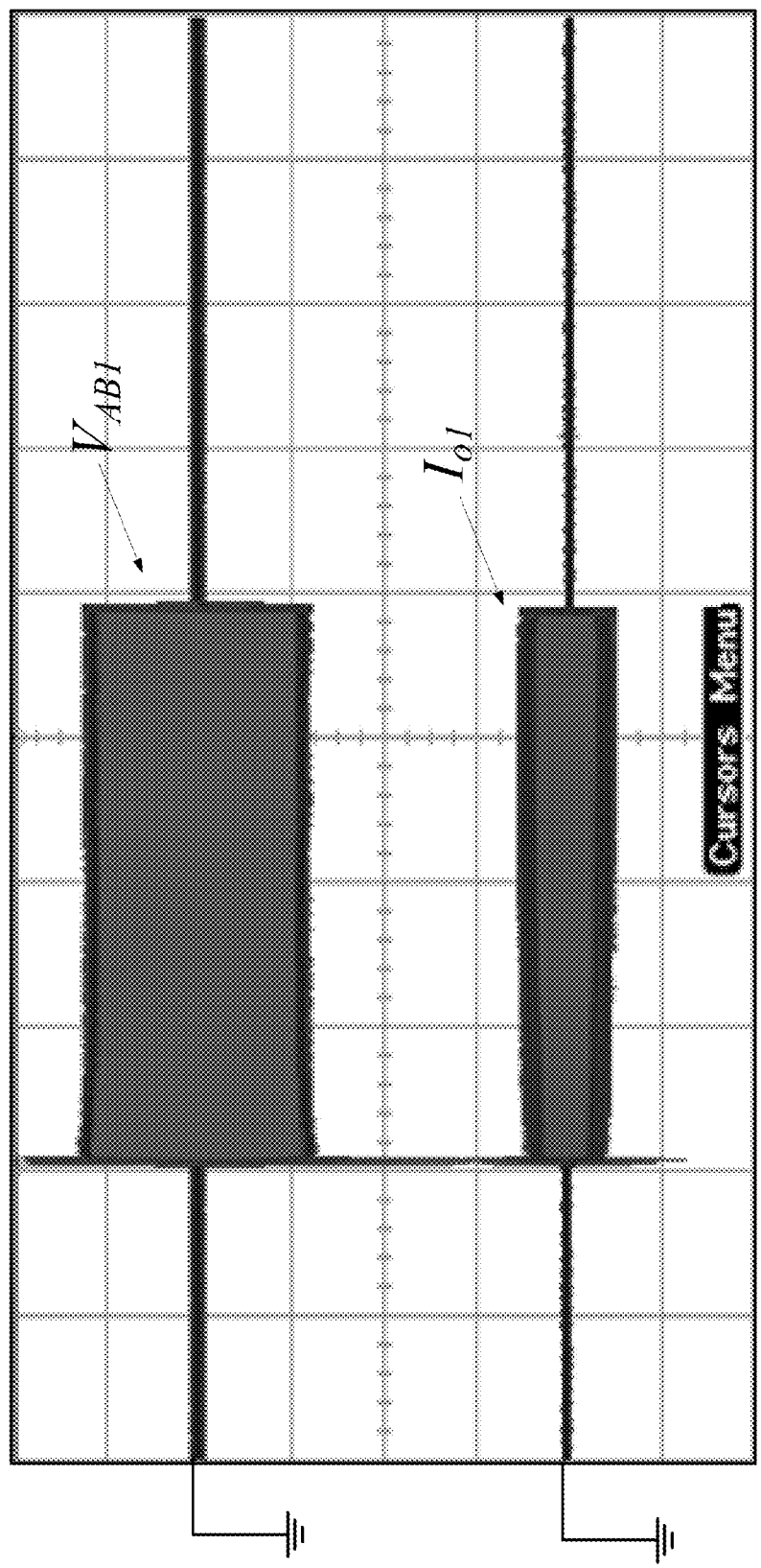
FIGS. 18 and 19 are waveform diagrams of the stunning voltage and the stunning current when measuring poultry of the present invention.
Figure 19:
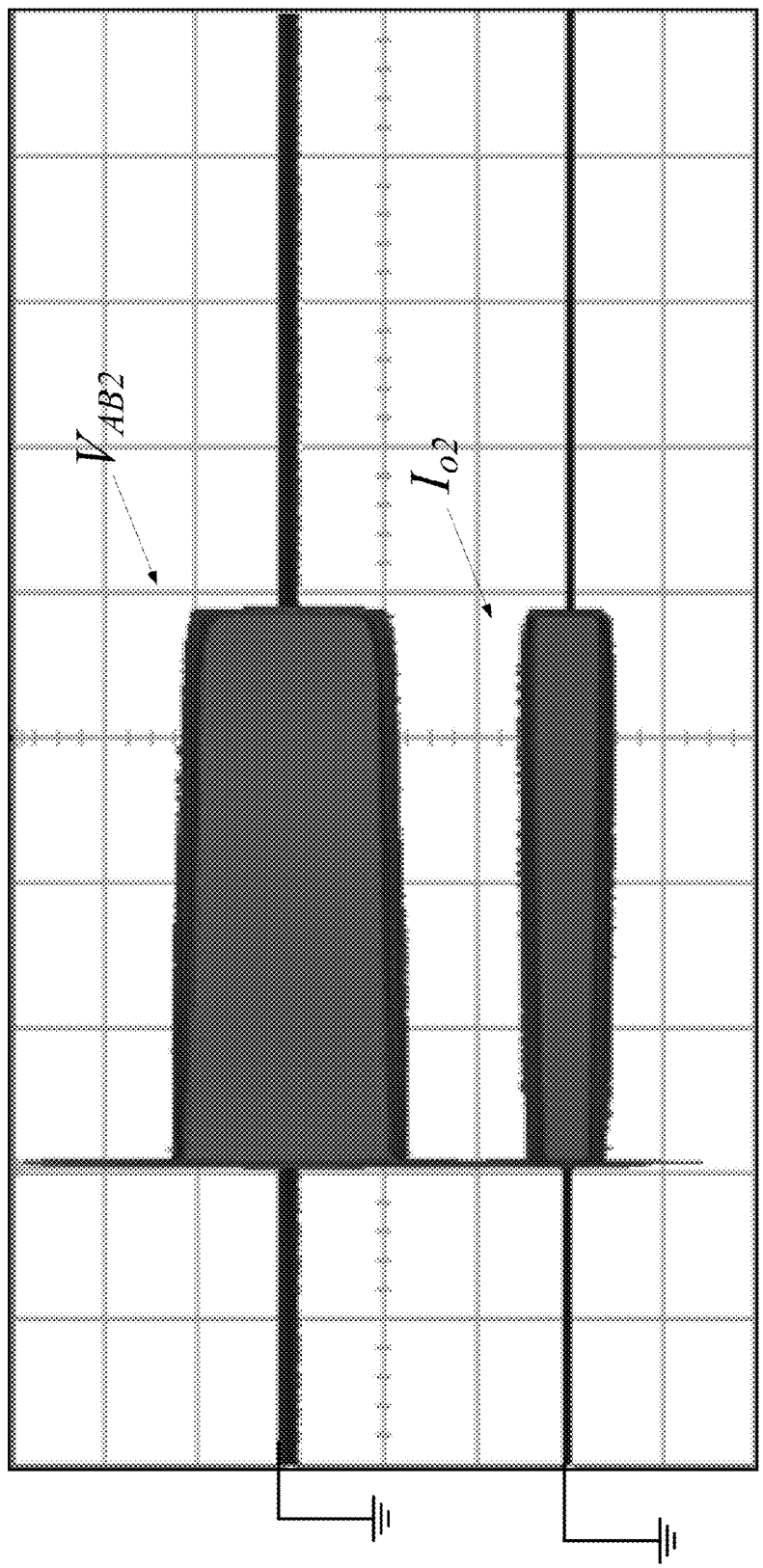

Reference is further made to FIG. 18 and FIG. 19. FIG. 18 and FIG. 19 show waveforms of the output stunning voltage $V_{AB}$ ($V_{AB1}$ and $V_{AB2}$) and the stunning current $I_O$ ($I_{O1}$ and $I_{O2}$). Although the two stunning voltages have different waveforms, the stunning currents are almost the same. Therefore, the stunner of the present invention can achieve current sharing effect.

To sum up, the present invention not only has the advantages of small size and light weight, but has very good conversion efficiency, and can generate stunning currents with current sharing feature. The present invention can also raise coma effectiveness of over 10% and carcass quality. Therefore, the present invention is a multifunction and smart stunning system.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

We claim:

1. A multi-channel stunner with current sharing feature connected to at least one poultry, said stunner comprising:
   at least two electrodes connected to said poultry; and
   a current sharing circuit connected to said electrodes and a stunning voltage, said current sharing circuit generating four sets of dither voltages applied onto said poultry via said electrodes, said poultry being stunned by a stunning current generated by said dither voltages and said stunning voltage on said poultry.

2. The multi-channel stunner with current sharing feature as claimed in claim 1, wherein any two sets of said dither voltages are series connected together and have the same amplitude and opposite polarities, any two sets of series-connected dither voltages connected to said poultry and the connection position of each said set of dither voltage and said stunning voltage are respectively connected to said poultry via an electronic switch, each said electronic switch being cut off after the skin impedance of said poultry breaks down so that each set of said dither voltages and said stunning voltage produce said stunning current with current sharing feature on said poultry.

3. The multi-channel stunner with current sharing feature as claimed in claim 2, wherein said electronic switch is an induction relay switch.

4. The multi-channel stunner with current sharing feature as claimed in claim 1, wherein said current sharing circuit comprises:
- at least four transformers connected to said electrodes and said stunning voltage, each said transformer generates one set of said dither voltage applied onto said poultry; and
- at least four resonance circuits connected to said transformers, each said resonance driving one of said transformers.

5. The multi-channel stunner with current sharing feature as claimed in claim 4, wherein said resonance circuit comprises:
- a capacitor with two terminals respectively connected to one of said transformers, said corresponding transformer being able to receive a voltage across said two terminals of said capacitor to produce said set of dither voltage; and
- an inductor with one terminal connected to one terminal of said capacitor and the other terminal connected to a total dither voltage, said total dither voltage being able to generate a current passing said inductor and build a potential difference across the two terminals of said capacitor.

6. The multi-channel stunner with current sharing feature as claimed in claim 1 further comprising:
- a full-bridge inverter for producing said stunning voltage;
- an active clamp flyback converter connected to said full-bridge inverter for driving said full-bridge inverter; and
- a half-bridge inverter integrated with said active clamp flyback converter and connected to an input voltage and said current sharing circuit, said half-bridge inverter being driven by said input voltage so as to activate said active clamp flyback converter and said current sharing circuit.

7. The multi-channel stunner with current sharing feature as claimed in claim 1, wherein said dither voltages are all high-frequency AC signals.

* * * * *